US008047713B2

(12) United States Patent
Ueno et al.

(10) Patent No.: US 8,047,713 B2
(45) Date of Patent: Nov. 1, 2011

(54) PLASMON RESONANCE DETECTOR

(75) Inventors: Kosei Ueno, Hokkaido (JP); Hiroaki Misawa, Hokkaido (JP); Dai Ohnishi, Kyoto (JP); Takui Sakaguchi, Kyoto (JP); Yoichi Mugino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 245 days.

(21) Appl. No.: 12/318,109

(22) Filed: Dec. 22, 2008

(65) Prior Publication Data

US 2010/0067016 A1    Mar. 18, 2010

(30) Foreign Application Priority Data

Dec. 27, 2007  (JP) ................................. 2007-337404
Oct. 22, 2008  (JP) ................................. 2008-272431

(51) Int. Cl.
*G01K 7/00*    (2006.01)
(52) U.S. Cl. ......... 374/163; 374/178; 374/179; 374/183
(58) Field of Classification Search .................. 374/163, 374/178, 179, 183
See application file for complete search history.

(56) References Cited

U.S. PATENT DOCUMENTS

| 5,792,667 A * | 8/1998 | Florin et al. ................. 436/147 |
| 2007/0215808 A1* | 9/2007 | Sekiguchi et al. ......... 250/339.01 |
| 2008/0285040 A1* | 11/2008 | Fourkas et al. ............... 356/445 |
| 2010/0157306 A1* | 6/2010 | Choi et al. .................... 356/445 |
| 2010/0284012 A1* | 11/2010 | Chinowsky et al. .......... 356/445 |

OTHER PUBLICATIONS

A. Hatta et al., "Observation of the Enhanced Infrared Absorption of p-Nitrobenzoate on Ag Island Films with an ATR Technique", Appl. Phys. A 29, 71-75 (1982).
K. George Thomas et al., "Uniaxial Plasmon Coupling through Longitudinal Self-Assembly of Gold Nanorods", J. Phys. Chem. B 2004, 108, 13066-13068.
K.K. Kaswell et al., "Preferential End-to-End Assembly of Gold Nanorods by Biotin-Streptavidin Connectors", J. Am. Chem. Soc. 2003, 125, 13914-13915.

* cited by examiner

*Primary Examiner* — Lisa Caputo
*Assistant Examiner* — Mirellys Jagan
(74) *Attorney, Agent, or Firm* — Rabin & Berdo, P.C.

(57) ABSTRACT

Provided is a plasmon resonance detector that can detect temperature change in optical devices, in which the metal structure having plasmon resonance absorption is used for the optical devices. A diode formed of a conductive substrate, an n-type semiconductor layer, an i-type semiconductor layer, a p-type semiconductor layer, an n electrode (negative electrode), a p electrode (positive electrode), an insulating film, or the like is used as a semiconductor device whose resistance value changes in accordance with temperature change. A nanochain formed by connecting a plurality of metal nanoparticles is disposed on this diode. When the nanochain is irradiated with light, the nanochain generates heat. The heat generated in the nanochain is conducted to the diode. The resistance value of the diode changes in accordance with temperature change, and thus this change is read, a temperature or an amount of heat generation of the nanochain is measured, and existence and strength of the plasmon resonance are detected.

17 Claims, 10 Drawing Sheets

PLASMON RESONANCE DETECTOR

BACKGROUND OF THE INVENTION

1. Field of the Invention

The present invention relates to a plasmon resonance detector using a metal structure that has plasmon resonance absorption.

2. Description of the Related Art

A fine metal body (for example, metal particulates of nanometer size) can demonstrate optical response called "localized (surface) plasmon resonance absorption" in a particular wavelength region among a wide wavelength region from the visible wavelength to the infrared wavelength, depending on the form and size of the fine metal body. Metals that demonstrate the localized plasmon resonance absorption include noble metals such as gold, silver, and platinum. However, even a metal of the same kind has a variation in the localized plasmon resonance absorption wavelength depending on its size and form. It has been attempted to apply to various optical devices such a property of the fine metal body whose absorption wavelength varies depending on differences in the size and form of the fine metal body.

A metal structure having a plurality of fine metal bodies disposed on a substrate may have the plasmon resonance absorption in the wide region from the visible region to the infrared region on the basis of a principle of the localized (surface) plasmon. When attempting to apply such a metal structure to an optical device or sensor, it is important to adjust the wavelength region of the plasmon resonance absorption.

Moreover, phenomenon that a photoelectric field enhancement phenomenon through a plasmon at the surface of the metal structure enhances infrared absorption is found out (for example, see Applied Physics A, vol. 29, pp. 71-75 (1982)). However, these mechanisms have not been clarified yet and a method for quantitative measurement of the enhanced absorption or the like has not been established. Therefore, when the metal structure having a plasmon resonance frequency in a desired infrared region can be produced, an optical device or measurement system using the above-mentioned phenomenon will be constructed.

The wavelength region of the plasmon resonance absorption that the above-mentioned metal structure has is influenced by the "elongated form of the fine metal body disposed on the substrate (aspect ratio when the fine metal body is rod-like)." In other words, disposition of the elongated fine metal body (with a higher aspect ratio) on the substrate shifts the wavelength region of the plasmon resonance absorption to a longer wavelength side, while disposition of the short fine metal (with a lower aspect ratio) on the substrate shifts the wavelength region of the plasmon resonance absorption to a shorter wavelength side.

On the other hand, a technique by which a plurality of rod-like nano metal (gold: Au) bodies are chemically bonded and connected has been known (for example, see J. Phys. Chem. B, 108, 13066 (2004) and JACS, 125, 13915 (2003)). These nano metal bodies are just bonded through a chemical substance that is not a metal, and strictly speaking, these nano metal bodies have a structure of single metal bodies in which the nano metal bodies are not directly connected to each other. The nano metal bodies can therefore obtain the plasmon resonance absorption on the side of the longer wavelength.

By the way, when optical devices such as photodetectors and devices for measuring absorbance are produced using a nano metal body as mentioned above, it is necessary to use a micro FT-IR measuring device or the like for measuring existence and strength of the plasmon resonance absorption. In addition, a device for optical analysis is needed even when it is desired to use the optical device as a plasmon resonance sensor for which the nano metal body is used. This causes a problem of increase in size of the optical device.

The present invention has been made to solve the above mentioned problem. An object of the present invention is to provide a plasmon resonance detector for which a metal structure having plasmon resonance absorption is used, and that can detect plasmon resonance with a simple structure allowing miniaturization of the detector.

SUMMARY OF THE INVENTION

In order to achieve the above-mentioned object, a first aspect of the present invention is a plasmon resonance detector including: a nanochain formed of a plurality of metal nanoparticles connected to each other; and a temperature sensing element in which the nanochain is disposed, in which a temperature change caused by plasmon resonance absorption of the nanochain is detected from a change in an electrical characteristic of the temperature sensing element in accordance with the temperature change.

A second aspect of the present invention is the plasmon resonance detector according the first aspect, in which the temperature sensing element is formed of a semiconductor device, and the electrical characteristic is a resistance value.

A third aspect of the present invention is the plasmon resonance detector according to the second aspect, in which the semiconductor device is formed of a diode.

A fourth aspect of the present invention is the plasmon resonance detector according to the third aspect, in which the nanochain is disposed around an electrode of the diode, and one corner of at least one of the metal nanoparticles that form the nanochain faces toward the electrode.

A fifth aspect of the present invention is the plasmon resonance detector according to the fourth aspect, in which the electrode and the nanochain are disposed to be in non-contact with each other.

A sixth aspect of the present invention is the plasmon resonance detector according to the second aspect, in which the semiconductor device is formed of a silicon film.

A seventh aspect of the present invention is the plasmon resonance detector according to the sixth aspect, in which one corner of at least one of the metal nanoparticles that forms the nanochain is disposed on the silicon film.

An eighth aspect of the present invention is the plasmon resonance detector according to the first aspect, in which the temperature sensing element is formed of a thermocouple and the electrical characteristic is thermal electromotive force.

A ninth aspect of the present invention is the plasmon resonance detector according to the eighth aspect, in which the nanochains are disposed so as to sandwich a temperature measuring junction of the thermocouple, and one corner of at least one of the metal nanoparticles that forms the nanochain faces toward the temperature measuring junction.

A tenth aspect of the present invention is the plasmon resonance detector according to the first aspect, in which the temperature sensing element is formed of a metal, and the electrical characteristic is a resistance value.

An eleventh aspect of the present invention is the plasmon resonance detector according to any one of the eighth to tenth aspects, in which a region where the nanochain is disposed in the temperature sensing element is formed on a heat insulator.

A twelfth aspect of the present invention is the plasmon resonance detector according to the first aspect, in which the temperature sensing element is formed of a pyroelectric material and the electrical characteristic is an amount of charge attributed to polarization.

In a plasmon resonance detector according to the present invention, a nanochain is disposed in a temperature sensing element whose electrical characteristic varies in accordance with temperature change. Therefore, when plasmon resonance absorption occurs and the nanochain generates heat, a temperature of the temperature sensing element rises in accordance with the heat generation. Since the increase in the temperature of the temperature sensing element varies the electrical characteristic (electrical parameter) of the temperature sensing element, it is possible to detect existence and strength of plasmon resonance. Additionally, resistance, thermal electromotive force, amount of charge attributed to polarization, or the like can be used as the electrical characteristic of the temperature sensing element.

DETAILED DESCRIPTION OF THE PREFERRED EMBODIMENTS

Figure 1:
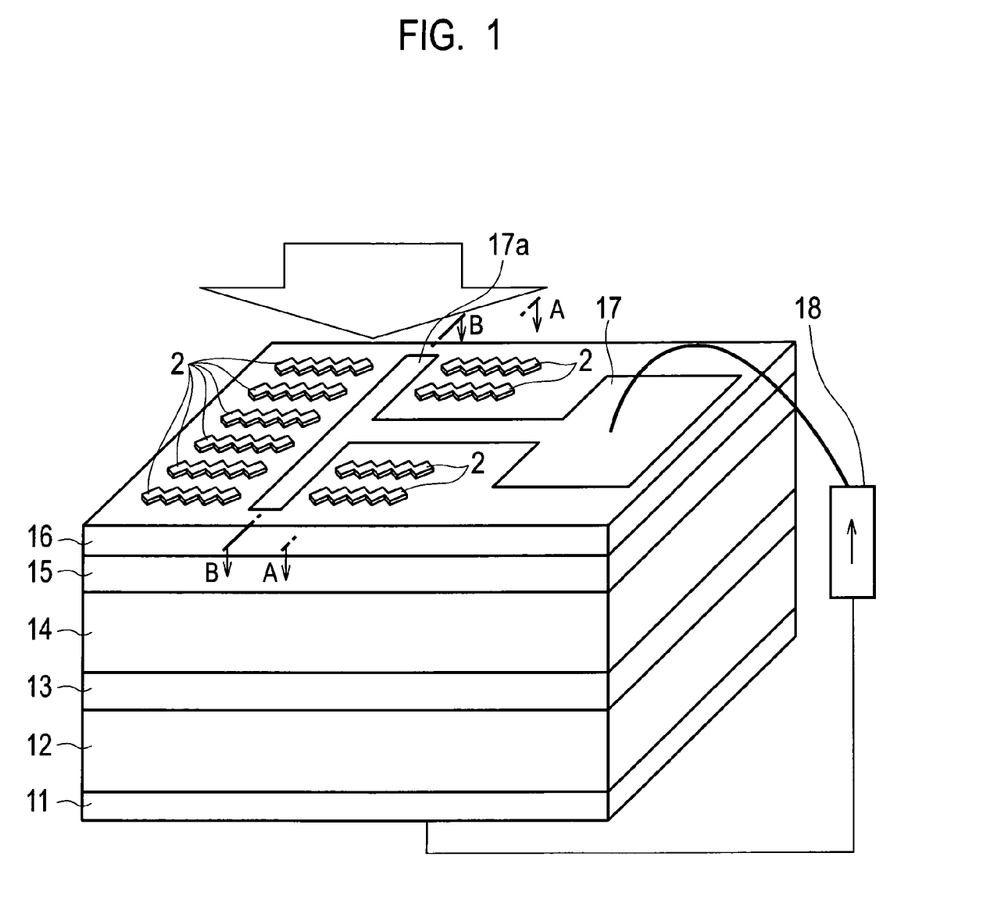
FIG. 1 is a perspective view showing an example of a structure of a plasmon resonance detector according to the present invention.
Figure 2A:
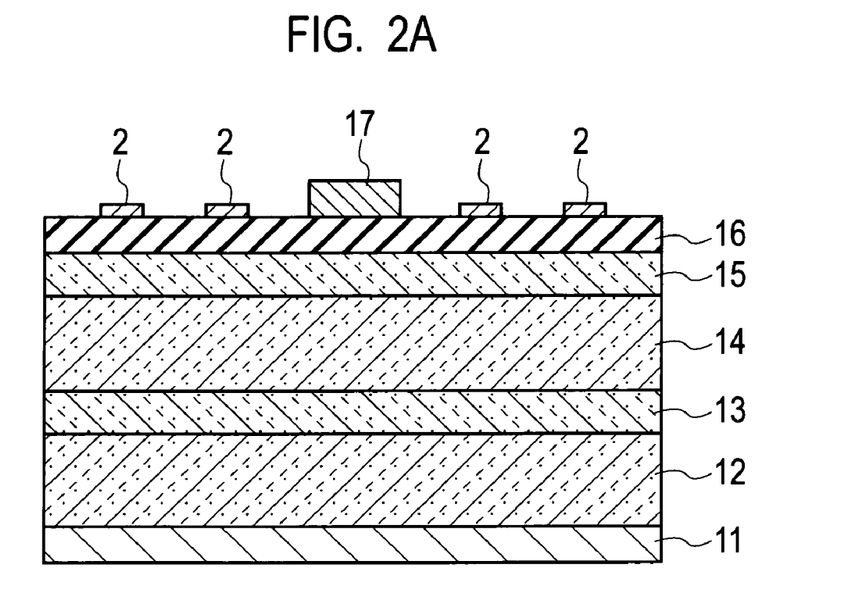
FIG. 2 is a sectional view showing cross sections taken along A-A and B-B of FIG. 1.
Figure 2B:
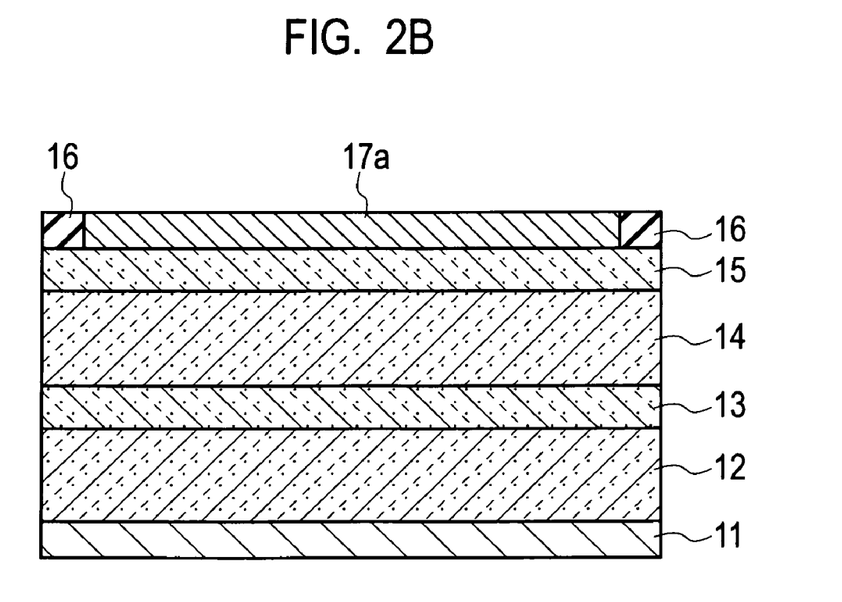

Hereinafter, one embodiment of the present invention will be described with reference to the drawings. FIG. 1 schematically shows an overall perspective view of a plasmon resonance detector according to the present invention. FIG. 2A shows a sectional view taken along A-A of FIG. 1, and FIG. 2B shows a sectional view taken along B-B of FIG. 1.

FIG. 1 shows an example of a configuration of the plasmon resonance detector in which a semiconductor device is used for a temperature sensing element. A diode is used for the semiconductor device (semiconductor device 20 described later) shown in FIG. 1, and a resistance value, one of electrical characteristics, varies in accordance with temperature change. In the plasmon resonance detector shown in FIG. 1, a nanochain 2 having a plurality of metal nanoparticles connected to one another is disposed on the diode. The diode is a PIN junction type diode, and is formed of a conductive substrate 12, an n-type semiconductor layer 13, an i-type semiconductor layer 14, a p-type semiconductor layer 15, an n electrode (negative electrode) 11, a p electrode (positive electrode) 17, an insulating film 16, etc.

On the conductive substrate 12, the n-type semiconductor layer 13, the i-type semiconductor layer 14, and the p-type semiconductor layer 15 are laminated. The n electrode (negative electrode) 11 is formed on a rear surface of the conductive substrate 12, and the p electrode (positive electrode) 17 is formed on the p-type semiconductor layer 15. The p electrode 17 is formed to have an H shape. As shown in FIG. 2, a p electrode heat conducting part 17a that forms apart of the p electrode 17 is formed to contact the p-type semiconductor layer 15. Additionally, the insulating film 16 is formed on the p-type semiconductor layer 15 except a region where the p electrode heat conducting part 17a is disposed. On the insulating film 16, a plurality of nanochains 2 and the p electrode 17 except the p electrode heat conducting part 17a are disposed.

Figure 7A:
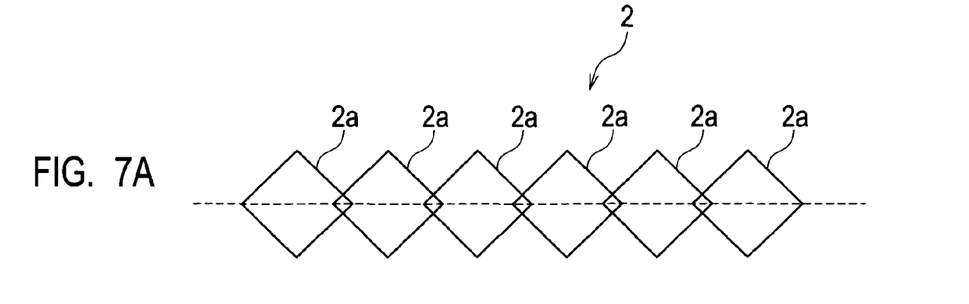
FIG. 7 is a diagram showing an example of a configuration of a photon detector for which a nanochain is used.
Figure 7B:
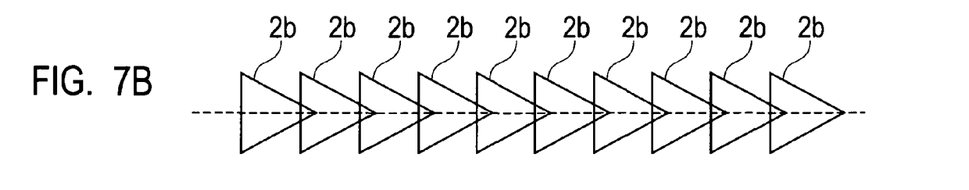
Figure 7C:
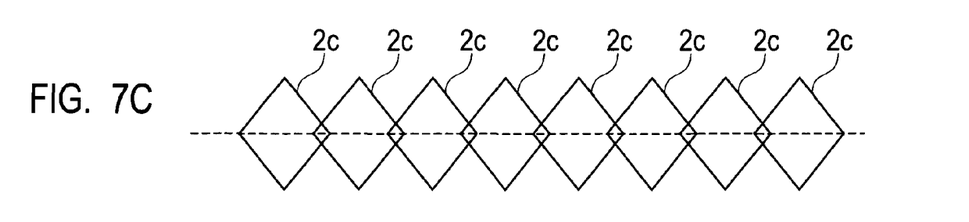

The nanochain 2 is a metal structure that has plasmon resonance absorption, and, as shown in FIG. 7, a plurality of metal nanoparticles are connected to one another through a bottleneck. In FIG. 7A, the plane shape of each metal nanoparticle 2a is formed to be square. In FIG. 7B, the plane shape of each metal nanoparticle 2b is formed to be isosceles triangular. In FIG. 7C, the plane shape of each metal nanoparticle 2c is formed to be rhombic. Thus, desirably, the metal nanoparticle has a shape including a constant corner.

Description will be given when the nanochain 2 of FIG. 7A is used among FIGS. 7A, 7B, and 7C. The corner of the metal nanoparticle 2a of the nanochain 2 is disposed so as to face the p electrode heat conducting part 17a, formed in a line shape, of the p electrode 17. On the other hand, a constant current source 18 is connected between a region of an end of the p electrode 17 and the n electrode 11.

An example of a specific configuration of the diode in FIG. 1 will be shown. The conductive substrate 12 is formed of an n-type GaAs substrate. The n-type semiconductor layer 13 is formed of an n-type GaAs layer. The i-type semiconductor layer 14 is formed of a non-doped GaAs layer. The p-type semiconductor layer 15 is formed of a p-type GaAs layer. The insulating film 16 is formed of $SiO^2$ or the like. The n electrode 11 is formed of, for example, a metal multilayer such as AuGe/Ni/Au, and the p electrode 17 is formed of, for example, a metal multilayer such as Ti/Au. In each semiconductor layer, Si or the like are used as an n-type impurity and Mg or the like are used as a p-type impurity. The diode may be a PN junction type. However, by using a PIN junction type as in the present embodiment, a depletion layer region can be expanded and a width of a temperature detection area can be increased.

Here, a structure of the nanochain 2 will be described in detail with reference to FIG. 7. FIGS. 7A to 7C show the structures of the nanochain 2 having a shape of the metal nanoparticle different from one another. The nanochain 2 is the metal structure having the plasmon resonance absorption, and in the case of FIG. 7A, a plurality of metal nanoparticles 2a are connected to one another through bottlenecks. Here, the term "bottleneck" denotes a part formed in a manner that apart of a metal nanoparticle 2a overlaps a part of another metal nanoparticle 2a, as shown in FIG. 7A. In other words, one nanoparticle 2a slightly overlaps another nanoparticle 2a adjacent to the one nanoparticle 2a. This bottleneck allows free electrons included in the one nanoparticle to move to the adjacent nanoparticle, to some extent. The structure concerning the above-mentioned bottleneck is similarly formed in the metal nanoparticles 2b of FIG. 7B and the metal nanoparticles 2c of FIG. 7C.

When an elongated single fine metal body as shown in J. Phys. Chem. B, 108, 13066 (2004) and JACS, 125, 13915 (2003) in the conventional art is used, absorption on the basis of multimode occurs and wavelength selectivity worsens. Accordingly, in a case of application to optical devices such as photodetectors, such an elongated single fine metal body has disadvantages. However, as shown in FIG. 7, when the nanochain formed of the metal nanoparticles 2a, 2b, or 2c is used, resonance wavelength of localized plasmon can be formed on a longer wavelength side, and no absorption on the basis of multimode is shown (higher wavelength selectivity is obtained), thereby, allowing detection of light in a terahertz region.

A material of the metal nanoparticles 2a to 2c may be any metal having a property that surface plasmon absorption occurs when the metal is used as a nanoparticle. The example of the material includes noble metals such as gold, silver, and platinum. Alternatively, the metal nanoparticles 2a to 2c may be a nano object formed of a different material covered with one of these metals.

As mentioned above, in the nanochain 2, the plurality of metal nanoparticles are connected with one another through the bottleneck. When there are a plurality of bottlenecks (i.e., three or more metal nanoparticles are connected), preferably, bottleneck centers are disposed on a straight line, as shown in FIG. 7. Disposition of the bottleneck centers on the straight line makes the free electrons more easily move between the nano particulates through the bottlenecks.

Since each of the connected metal nanoparticles has thickness, the shape of the metal nanoparticle is three-dimensionally a quadrangular prism in FIG. 7A, a triangular prism in FIG. 7B, and a quadrangular prism in FIG. 7C. When the metal nanoparticle has a shape of a triangular prism or a quadrangular prism, the bottleneck is preferably formed by connecting ridgelines of the metal nanoparticles to each other. Thereby, a neck width of the bottleneck can be easily made smaller.

When observed from above in a vertical direction to the substrate, i.e., in a plan view, preferably, the metal nanoparticle has a polygonal shape and has the corner. Furthermore, preferably, the shape of the metal nanoparticle to be connected is a rectangular parallelepiped that is formed of square planes and rectangular planes. Preferably, the square plane is disposed horizontal to the substrate surface. In other words, preferably, the metal nanoparticle looks like a square in the plan view.

Preferably, the number of metal nanoparticles to be connected is approximately 2 to 50. Since absorption resonance wavelength is approximately proportional to the number of metal nanoparticles, the number of metal nanoparticles to be connected (the length of a metal body through which the bottlenecks are connected) can be selected appropriately in accordance with desired resonance absorption wavelength.

Preferably, the plurality of bottlenecks in the connected metal nanoparticles are disposed on a straight line, as above-mentioned. A whole length X of the nanochain 2 on this straight line is set in accordance with the resonance wavelength. The length X of the nanochain 2 is adjusted in accordance with size of the metal nanoparticles to be connected, the number of metal nanoparticles to be connected, etc. When the length of the nanochain 2 is increased, the plasmon resonance absorption wavelength of the metal structure shifts to a longer wavelength side.

Although Japanese Patent Application No. 2006-182637 has given detailed description about the above-mentioned content, it will be shown below that the plasmon resonance absorption wavelength is particularly dependent on the length X of the nanochain 2.

To begin with, the nanochain 2 was formed on a sapphire substrate as follows. Ultrasonic cleaning was performed on the surface of the sapphire substrate (10 mm×10 mm) for 3 minutes each with use of acetone, methanol, and ultrapure water in this sequence. A resist for positive type electronic lithography (Zep-520a made by Nippon Zeon Corporation) was spin-coated on the cleaned substrate surface (4000 rpm) to form a resist thin film (thickness: 200 nm) on the substrate. A desired pattern of the nanochain 2 was drawn at a dose rate of 1.2 μC/cm$^2$ using an electronic beam exposure apparatus having acceleration voltage of 100 kV. After development for 30 minutes, the sapphire substrate was rinsed and dried.

Next, sputtering of gold (Au) was performed on the substrate to form a metal film (40 nm). The substrate on which the metal film was formed was immersed in a resist remover solution, and ultrasonic cleaning was performed, followed by removal of the resist and liftoff.

Metal bodies having a shape obtained by respectively connecting 1 to 25 of rectangular parallelepiped metal nanoparticles to each other were formed on the sapphire substrate, so that the metal structures (nanochains 2) were obtained. A component of the metal nanoparticles was gold (Au). Each metal nanoparticle of the nanochain having a nano block shape was formed to be a rectangular parallelepiped having a square shape of 100 nm×100 nm when observed from above the substrate upper surface, and having a height of 40 nm from the substrate. Each adjacent two of the rectangular parallelepiped metal nanoparticles were connected to each other at ridgelines to form a bottleneck. A neck width of the bottleneck was 4.4 nm. Directions in which the nanochains were formed on the substrate were identical to each other. A constant interval of 1000 nm was set between these nanochains.

Figure 8A:
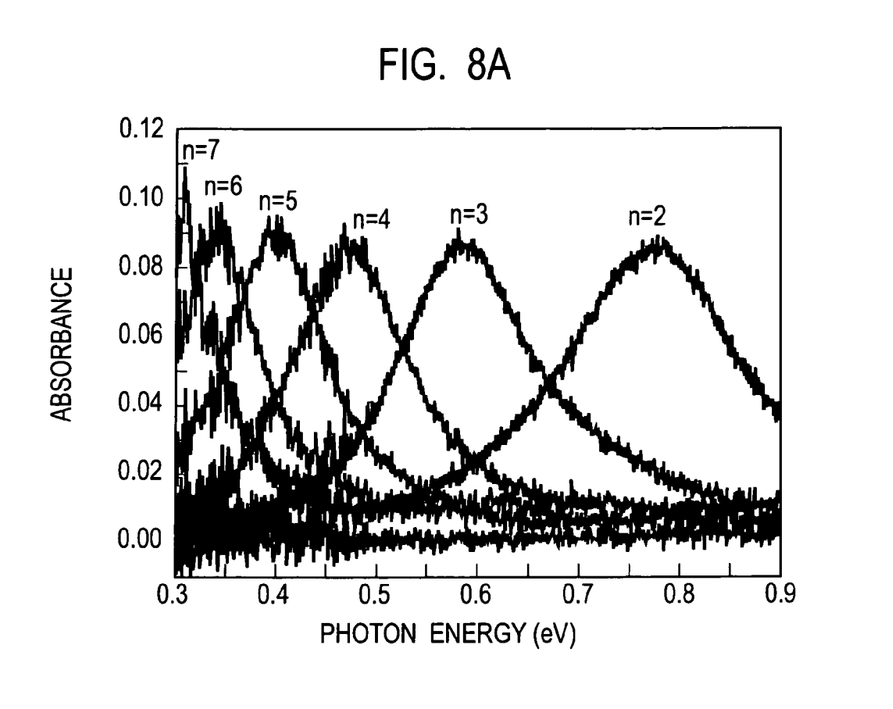
FIG. 8 is a diagram showing a relationship between the number of metal nanoparticles and a peak wavelength when the nanochain is used.
Figure 8B:
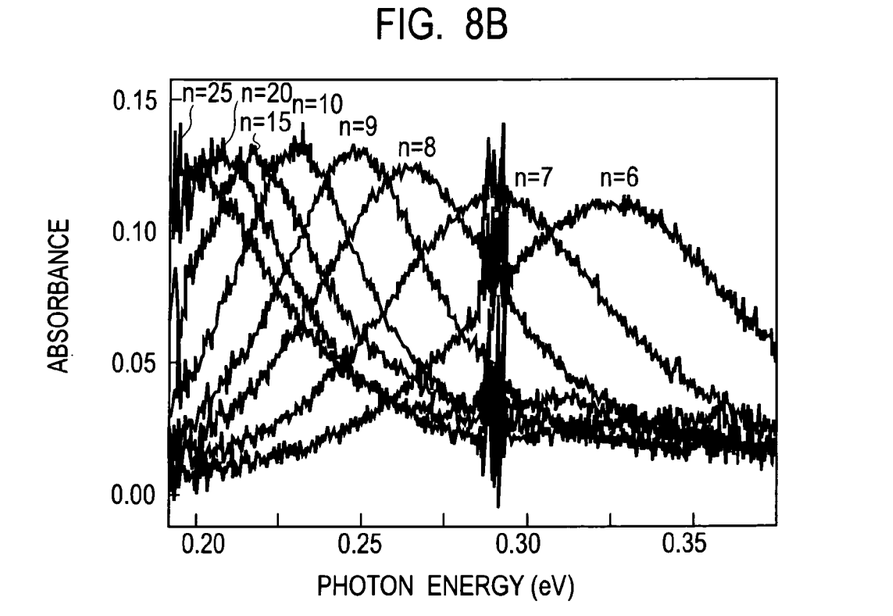

Using a micro FT-IR measuring device, these metal structures obtained by the above-mentioned formation were irradiated with light having a wavelength of 660 nm to 7142 nm from above (wave number of 15000 cm$^{-1}$ to 1400 cm$^{-1}$), and the absorbance values of the metal structures were measured. FIGS. 8A and 8B show the obtained results. FIG. 8A shows data of the nanochains having the number of the connected metal nanoparticles n of 1 to 7 respectively. Moreover, FIG. 8B shows data of the nanochains having the number of the connected metal nanoparticles n of 6 to 25 respectively. The peak is not shown for the spectrum data of the metal structure having the number of the metal nanoparticles n of 1. This is because the peak exists out of the area shown (on a higher energy side).

FIGS. 8A and 8B show that as the number of the connected metal nanoparticles n is increased and the length X of the metal body is increased, a full width at half maximum of the spectrum reduces, and light in a region of small photon energy (light with longer wavelength) is absorbed. It is considered that this is because shift of the resonance wavelength to a longer wavelength side increases phase relaxation time of a plasmon.

As shown in FIG. 8, only the plasmon resonance absorption in a dipole mode was observed in the nanochain obtained by connecting the metal nanoparticles. It is inferred that this is because only a plasmon resonance band based on the free electrons that move back and forth through a nano contact of the bottleneck is observed.

As mentioned above, the wavelength of the light to be absorbed can be varied by varying the length X of the nanochain 2. By utilizing this, detection of the light with high wavelength selectivity is allowed.

Now, in the plasmon resonance detector of FIG. 1, a plurality of the above-mentioned nanochains 2 are disposed. By changing the length X of each nanochain, the plasmon resonance wavelength depending on the length X is absorbed.

As mentioned above, the corner of the metal nanoparticle 2a that exists at an end of the nanochain 2 is disposed so as to face the p electrode heat conducting part 17a of the p electrode 17. This is because the corner of each of the metal nanoparticles 2a to 2c serves as a strong electric field region, and therefore, the corner is a region where the temperature of the nanochain 2 rises most. The corner of the metal nanoparticle 2a and the p electrode heat conducting part 17a are disposed so as to be spaced from each other at a predetermined distance, to be in non-contact with each other. This is for maintaining the strong electric field region formed in the corner of the metal nanoparticle 2a. Moreover, in order to enable heat to be conducted to the depletion layer as easily as possible, the p electrode heat conducting part 17a is not formed on the insulating film 16 like other region of the p electrode 17, but formed on the p-type semiconductor layer 15 to be in contact with the p-type semiconductor layer 15. A current introduction region of the p electrode 17 connected with the constant current source 18 through a lead wire is formed to have a size of, for example, approximately 100 nm×100 nm.

Here, when the semiconductor device 20 receives the light in an arrow direction of FIG. 1 (from above), the plasmon resonance absorption corresponding to the length X of the nanochain takes place in the nanochains 2, so that the nanochains 2 generate the heat. The heat generated in each nanochain 2 is conducted to the p electrode heat conducting part 17a of the p electrode 17 by strong heat generated from the corner of the metal nanoparticle at the end of the nanochain 2. Next, the heat is conducted from the p electrode heat conducting part 17a formed of a metal to semiconductor layers such as the p-type semiconductor layer 15, the i-type semiconductor layer 14, or the like. Since thickness of the depletion layer varies at this time, the resistance value of the diode varies. Then, by measuring a voltage between the n electrode 11 and the p electrode 17, a change in temperature or heat generation of the nanochain 2 can be detected from a change in the measured voltage.

Figure 5A:
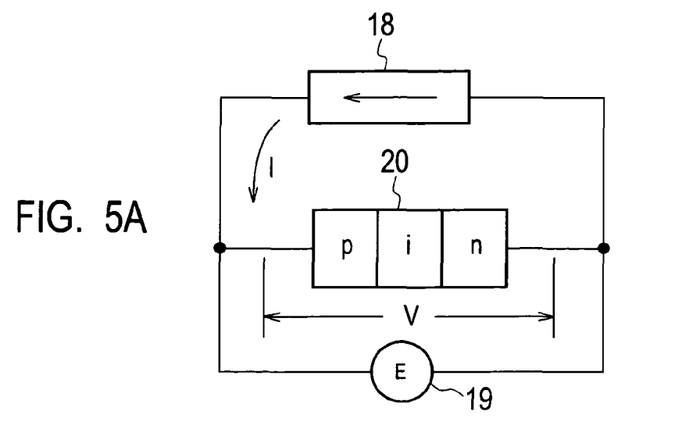
FIG. 5 is a diagram showing an example of a circuit arrangement for temperature detection.

FIG. 5 shows a basic configuration to detect the temperature change by use of the semiconductor device 20. In the embodiment of FIG. 1, a PIN junction type diode is used as the semiconductor device 20, and the circuit is configured according to the diode. FIG. 5A shows a configuration for detection by use of a constant current source, the configuration corresponding to the embodiment of FIG. 1. The semiconductor device 20 is the PIN junction diode. Reference numeral 18 indicates the constant current source, and reference numeral 19 indicates a voltmeter. While the voltmeter 19 is not shown in FIG. 1, the voltmeter 19 is connected in parallel with the constant current source 18.

Figure 6:
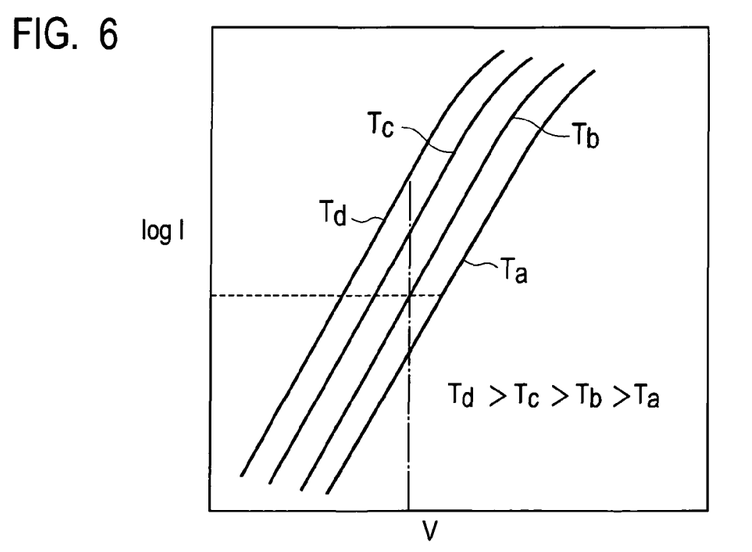
FIG. 6 is a diagram showing I-V characteristics where a temperature of a diode is a parameter.

Forward current I flows into the PIN junction diode from the constant current source 18, and a voltage V at the time is read with the voltmeter 19. These current-voltage (I-V) characteristics have temperature dependency, as shown in FIG. 6. Ta, Tb, Tc, and Td of FIG. 6 show different temperatures of the diode, where a relationship of Ta<Tb<Tc<Td is established. When the temperature rises, generally, the resistance value of the diode reduces and the forward current increases. Accordingly, as shown in the drawing, an I-V characteristic curve shifts to the left side. When the constant current source is used, as a dotted line of FIG. 6 shows, there is a relationship that a voltage Vt reduces when the temperature T rises, where the voltage Vt is the voltage at which a current becomes a set current value. The temperature is obtained by calculating the correlation characteristic of the temperature T and the voltage Vt first.

Figure 5B:
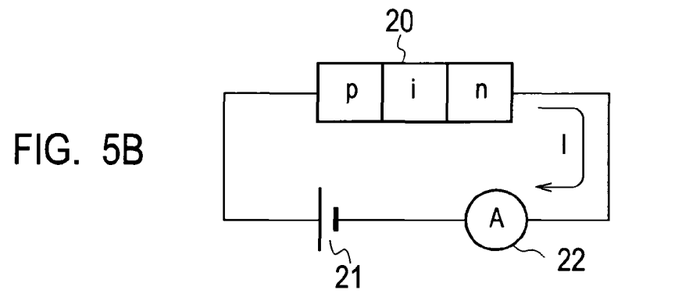

While the constant current I flows and the voltage V is read in the temperature detection method of FIG. 5A, a constant voltage source may be used as in the temperature detection method of FIG. 5B. Here, in the PIN junction diode shown in the embodiment of FIG. 1, connection of the constant current source 18 is eliminated. Instead of this, a constant voltage source 21 and an ammeter 22 are connected in series between the p electrode 17 and the n electrode 11. Then, a constant voltage V is applied from the constant voltage source 21, and a value of the current I is read with the ammeter 22. In this case, as shown by a dashed dotted line of FIG. 6, there is a relationship that the current It increases when the temperature T rises, where the current It is a current at which the voltage becomes a set voltage value. The temperature is obtained by calculating the correlation characteristic of the temperature T and the current It first.

As mentioned above, when the change in the temperature or the amount of heat generation is known, a magnitude of the plasmon resonance absorption can be detected. A greater change in the temperature or the amount of heat generation results in greater strength of the plasmon resonance absorption.

Figure 3:
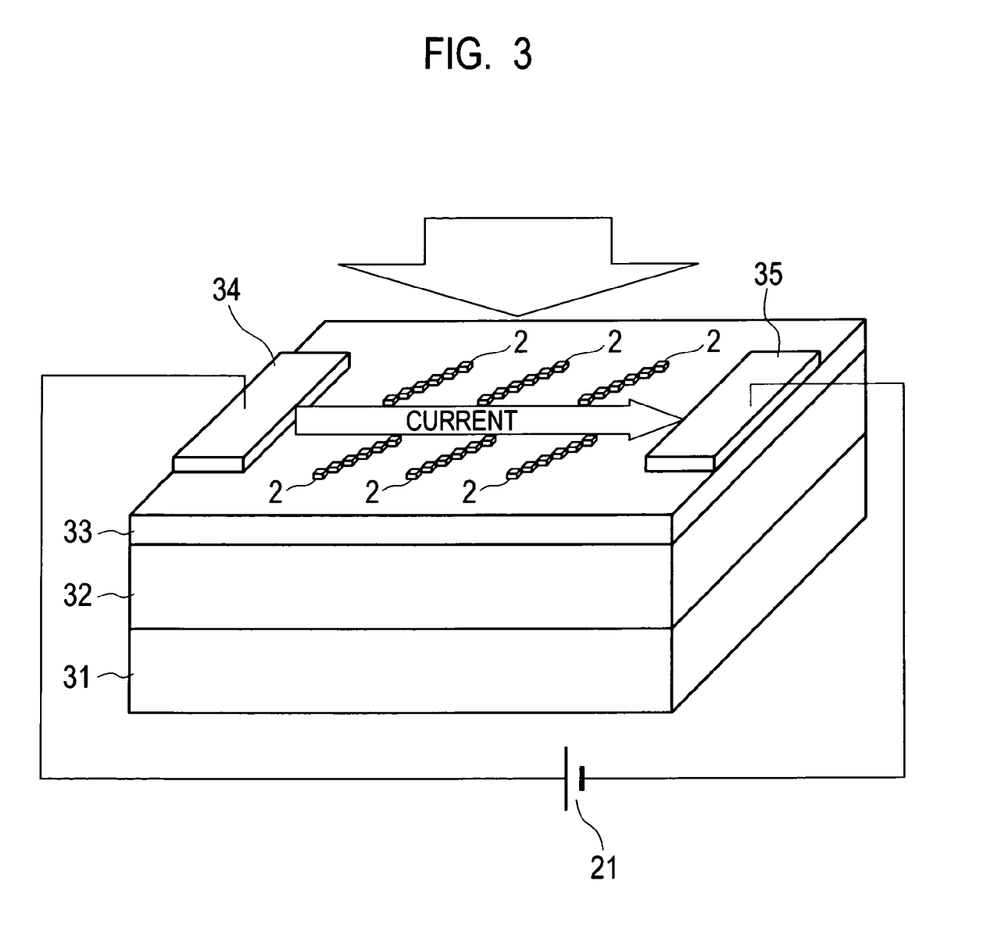
FIG. 3 is a perspective view showing an example of other structure of the plasmon resonance detector according to the present invention.

Next, FIG. 3 shows an example of other configuration of the plasmon resonance detector, i.e., an example of a schematic configuration when a silicon film is used for the semiconductor device 20 where the resistance value, one of the electrical characteristics, varies in accordance with temperature change. On an Si (silicon) substrate 31, an insulating film 32 and an Si (silicon) film 33 are sequentially laminated. On the Si (silicon) film 33, a plurality of the nanochains 2 already described are disposed. On the Si film 33, at both ends of the Si film 33, an electrode 34 and an electrode 35 are provided facing each other, so that all the disposed nanochains 2 may be interposed between the electrode 34 and the electrode 35.

Here, $SiO_2$ or the like is used for the insulating film 32. The insulating film 32 is formed to have thickness of, for example, 5 μm. In order to use the Si film 33 as a semiconductor device, the Si film 33 is formed of a thin film that is made of silicon doped with a small amount of an impurity and that has a thickness of, for example, approximately 100 nm. When the semiconductor device 20 receives the light in an arrow direction of FIG. 3 (from above), the plasmon resonance absorption corresponding to the length X of the nanochain takes place in the nanochains 2, so that the nanochains 2 generate heat. The heat generated in each nanochain 2 is conducted to the Si film 33, and the temperature of the Si film 33 rises. The Si film 33 has an effect that the resistance value reduces when the temperature rises. When the constant voltage source 21 is used, reduction in the resistance value causes increase in the current that flows between the electrode 34 and the electrode 35. Accordingly, the temperature change is detected using this property.

In the configuration of FIG. 3, compared with the configuration of FIG. 5, the lightly-doped Si film 33 is used as the semiconductor device 20 instead of the PIN junction diode, and the circuit arrangement is equivalent to the configuration of FIG. 5B in which the constant voltage source 21 is used. Although the ammeter 22 for measuring the current that flows between the electrode 34 and the electrode 35 is not shown in FIG. 3, the ammeter 22 is connected with the constant voltage source 21 in series.

The current-voltage (I-V) characteristic of the Si film 33 have the temperature dependency similar to that in FIG. 6. Therefore, when the constant voltage source is used, as shown by the dashed dotted line of FIG. 6, there is a relationship that the current It increases when the temperature T rises, where the current It is a current at which the voltage becomes a set voltage value. By calculating the correlation characteristic of the temperature T and the current It first, the temperature is obtained similarly to the case of FIG. 1. Alternatively, as described, the constant current source may be used in the case of FIG. 1, as shown in FIG. 5A.

Figure 4A:
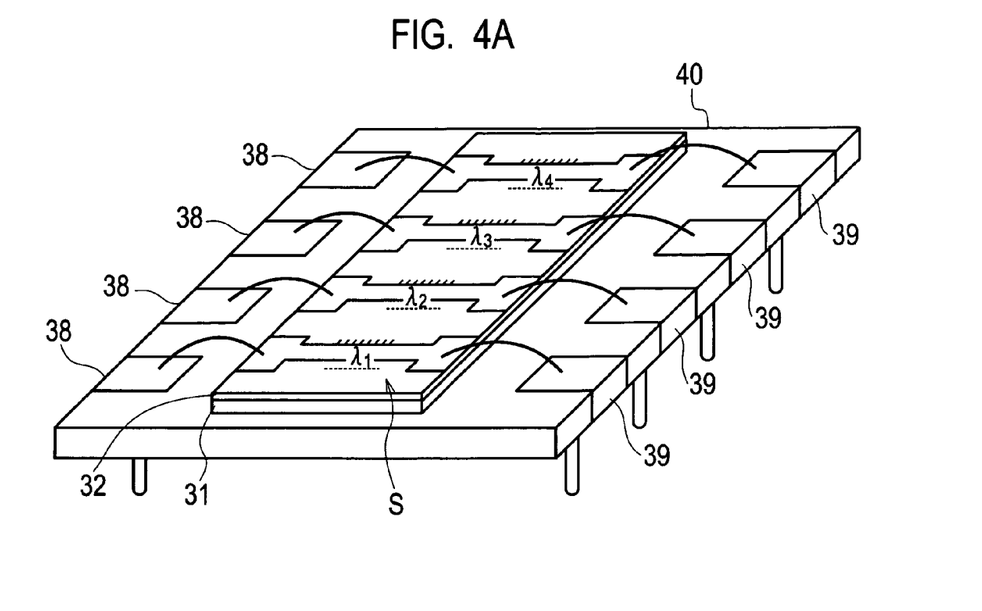
FIG. 4 is a perspective view showing an example of a structure of a plasmon resonance detector in which a plurality of the plasmon resonance detection structures in FIG. 3 are disposed.

FIG. 4 shows an example of a configuration in which the light of a different wavelength $\lambda_1$ to $\lambda_N$ is detected, by use of a plurality of the plasmon resonance detection structures of the type of FIG. 3. As shown in FIG. 4A, light detectors that detect four types of the wavelengths, $\lambda_1$, $\lambda_2$, $\lambda_3$, $\lambda_4$, are formed. The four light detectors are formed on the insulating film 32. The insulating film 32 is laminated on a Si substrate 31. An IC socket 40 includes four electrodes 38 and four electrodes 39 for measuring each temperature of four light detectors. On the lower surface of each electrode, a socket pin used for mounting the electrode onto a substrate or the like is formed. In other words, each light detector is connected with a pair of the electrodes 38 and 39 through a gold wire. One of the electrodes 38 and 39 is a positive electrode, and the other is a negative electrode.

Figure 4B:
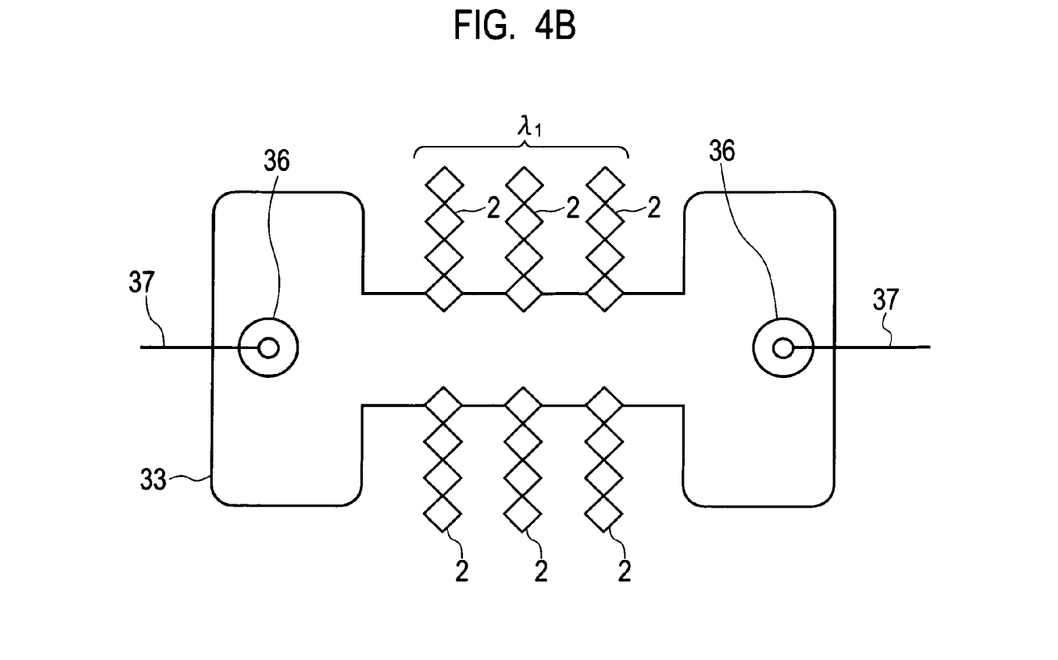

FIG. 4B shows an enlarged drawing of each light detector. FIG. 4B representatively shows a portion indicated by a symbol S of FIG. 4A, i.e., the light detector of the wavelength $\lambda_1$. Other light detectors have a similar configuration. These light detectors are formed so as to have different plasmon resonance frequencies respectively by having the lengths X of the nanochains different from each other.

An end portion of each of the nanochains 2, particularly, the corner of the metal nanoparticle 2a that forms the nanochain 2 is disposed on the lightly-doped thin film Si 33 so that the corner overlaps at least the lightly-doped thin film Si 33. A bonding pad 36 formed on the lightly-doped thin film Si 33 is connected with the electrodes 38 and 39 through the gold wire 37.

Thus, the strong electric field region of the nanochain 2, i.e., the region where the temperature rises most, can be disposed on the lightly-doped thin film Si 33, at least by disposing the corner of the metal nanoparticle 2a so that the corner overlaps the lightly-doped thin film Si 33. Thereby, the generated heat can be promptly conducted. The change in the temperature or the amount of heat generation in each light detector can be detected from the change of the resistance value of the lightly-doped thin film Si 33 by providing the above-mentioned configuration and the circuit arrangement between a pair of the electrodes 38 and 39 as shown in FIG. 5A or 5B. In addition, existence of the plasmon resonance and a magnitude thereof as well as the resonance wavelength can be detected from the change in the temperature or the amount of the heat generation.

For example, when the device is irradiated with the light from above in FIG. 4, the resonance absorption of each wavelength of $\lambda_1$, $\lambda_2$, $\lambda_3$, and $\lambda_4$ occurs in its corresponding nanochain, so that the resonance wavelength can be detected.

Figure 9A:
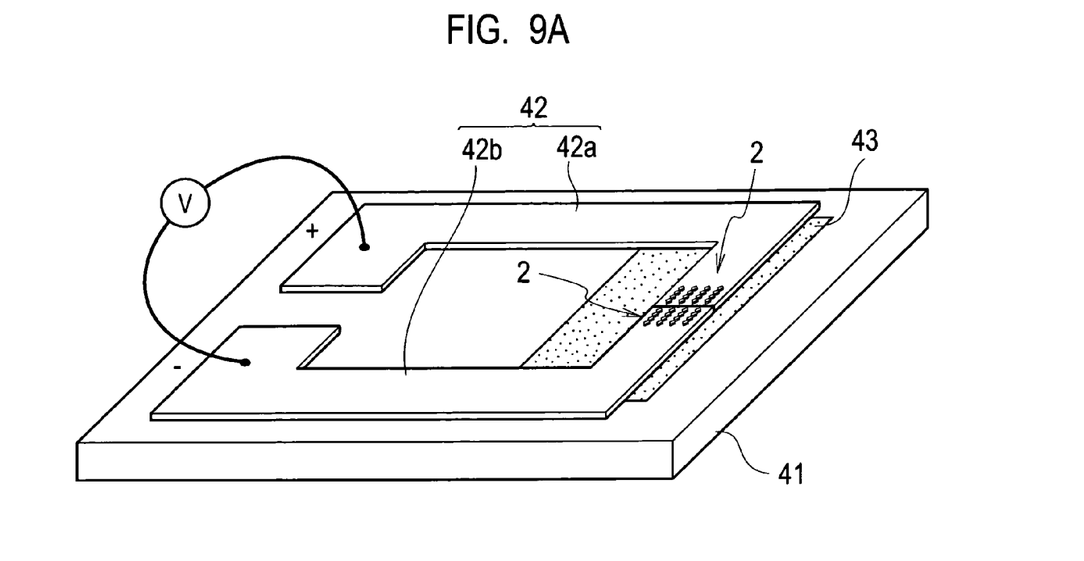
FIG. 9 is a perspective view showing an example of other structure of the plasmon resonance detector according to the present invention.
Figure 9B:
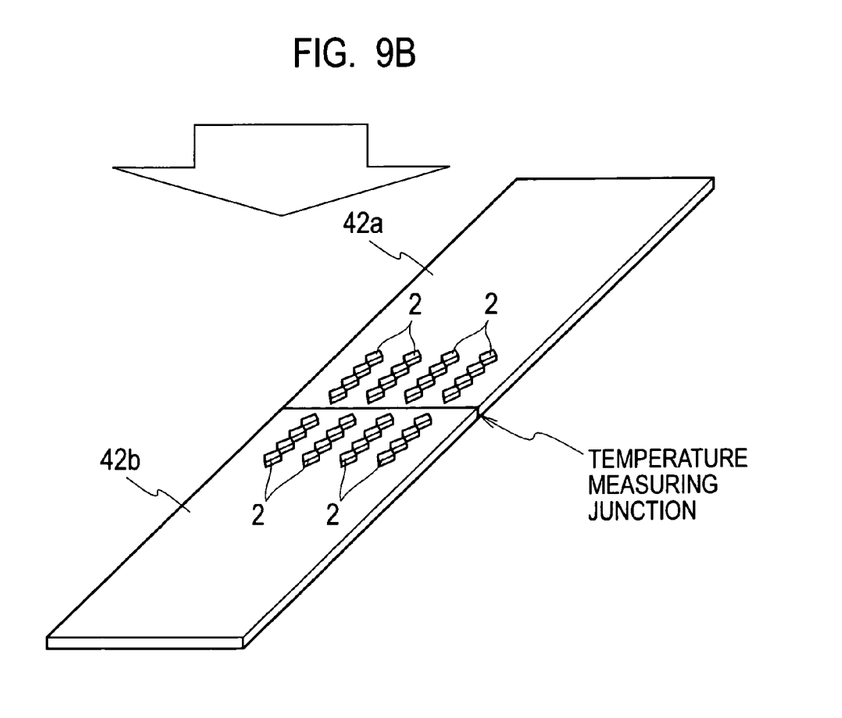

Next, FIG. 9 shows an example of a schematic configuration of the plasmon resonance detector in which the temperature sensing element is used. In this example, in the temperature sensing element, thermal electromotive force, which is one of the electrical characteristics, varies in accordance with temperature change. FIG. 9A shows an entire structure of the plasmon resonance detector, and FIG. 9B shows an enlarged drawing of a region where the nanochains 2 are disposed.

A thermocouple 42 is disposed on a substrate 41, and a plurality of the nanochains 2 are disposed in a predetermined region on the thermocouple 42. The thermocouple 42 is formed of two films made of dissimilar metals. An alloy of nickel and chromium (Chromel), iron, copper, a platinum-rhodium alloy, or the like are used for the metal film 42a of a positive leg (positive electrode). On the other hand, a nickel alloy (Alumel), a alloy of copper and nickel (constantan), platinum, or the like are used for the metal film 42b of a negative leg (negative electrode). These metal films 42a and 42b are formed using vapor deposition or sputtering. The substrate 41 is formed of a substrate with higher versatility, for example, a Si substrate, a GaAs substrate, etc.

As shown in FIG. 9B, the nanochains 2 are disposed at both sides of a junction, which acts as a temperature measuring junction, between the metal film 42a and the metal film 42b so as to sandwich the junction. One or more pairs of the nanochains 2 are disposed. On the other hand, in a voltmeter V of FIG. 9A, a connection in the metal film 42a or a connection in the metal film 42b is called a reference junction. The thermocouple 42 is a temperature sensor based on application of a phenomenon (Seebeck effect) in which, when a temperature of the temperature measuring junction is different from a temperature of the reference junction, a current flows between the metal film 42a and the metal film 42b, thereby generating the thermal electromotive force. When the nanochains 2 receive light or an electromagnetic wave in an arrow direction of FIG. 9 (from above), the plasmon resonance absorption corresponding to the length X of the nanochain takes place in the nanochains 2, so that the nanochains 2 generate heat.

The corner of the metal nanoparticle 2a that exists at the end of each nanochain 2 is disposed so as to face the temperature measuring junction. This is because the corner of each of the metal nanoparticles 2a to 2c serves as the strong electric field region, and therefore, the corner of each of the metal nanoparticles 2a to 2c is the region where the temperature of the nanochain 2 rises most, and the thermal electromotive force is generated due to temperature change in the temperature measuring junction. The heat generated in the corner of the metal nanoparticle 2a that exists at the end of each nanochain 2 is conducted to the temperature measuring junction. Then, the temperature of the metal film 42a and the metal film 42b at the junction rises. Accordingly, a difference in the temperature occurs between the reference junction and the temperature measuring junction, so that the thermal electromotive force occurs. By measuring this thermal electromotive force with the voltmeter V, an ammeter, or the like, change of the temperature can be detected. Thus, the plasmon resonance detector for which the thermocouple is used is based on the temperature change in the junction between two different metals, and therefore, is suitable for detection of local change in the temperature.

Furthermore, in order to guide the heat generated due to the plasmon resonance absorption to the temperature measuring junction without losing any heat, desirably the region having the temperature measuring junction and the nanochains 2 is disposed on a base material having a low heat dissipation property. In FIG. 9, among the regions of the metal film 42a and the metal film 42b, the metal film region having the temperature measuring junction and the nanochains 2 is formed on a heat insulator 43, not on the substrate 41. Since such a configuration allows suppression of the heat diffusion and concentration of the heat to the temperature measuring junction, a detector with high sensitivity can be provided. The heat insulator 43 is formed of a resin insulating layer, for example, $SiO_2$ or the like.

Figure 10A:
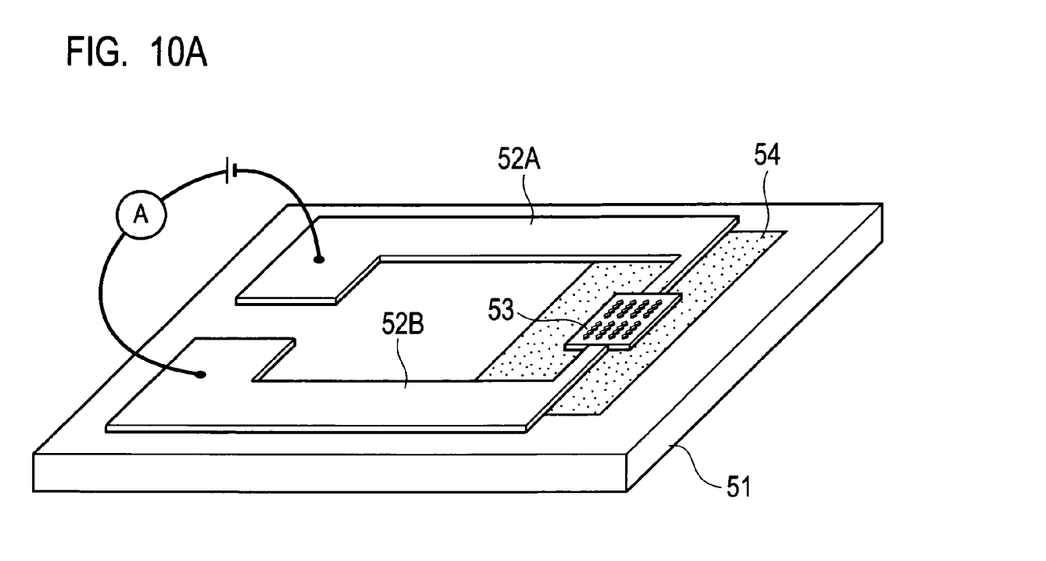
FIG. 10 is a perspective view showing an example of other structure of the plasmon resonance detector according to the present invention.
Figure 10B:
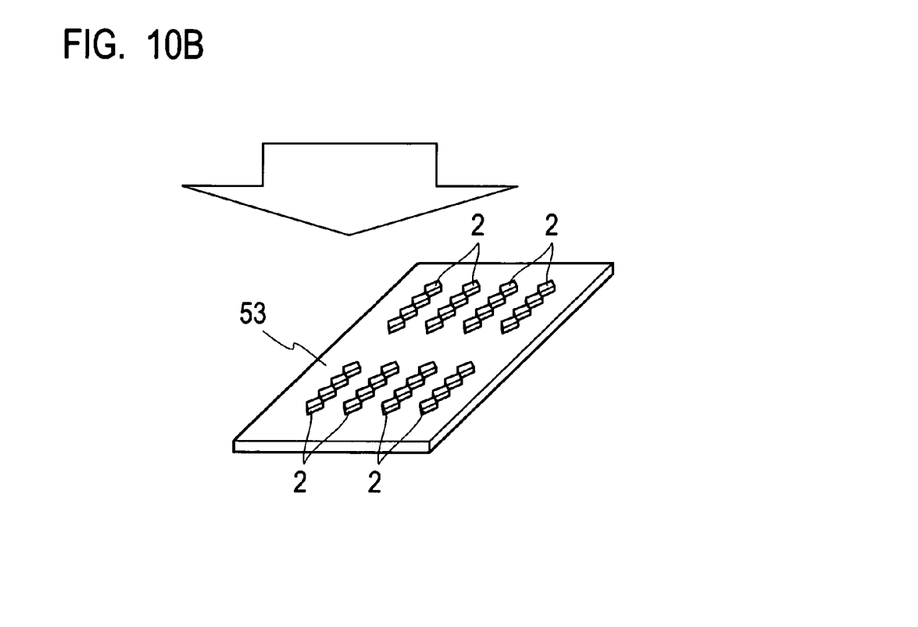

Next, FIG. 10 shows an example of a schematic configuration of the plasmon resonance detector in which a temperature sensing element is used. In the temperature sensing element, a resistance value, which is one of the electrical characteristics, varies in accordance with temperature change. In the present embodiment, a metal known as a temperature measurement resistance element is used for the temperature sensing element. FIG. 10A shows an entire structure of the plasmon resonance detector, and FIG. 10B shows an enlarged drawing of a region where the nanochains 2 are disposed.

Electrodes 52A and 52B formed of a metal film are disposed on a substrate 51. Edges of the electrodes 52A and 52B are connected to each other through a metal 53 interposed therebetween. On the metal 53, a plurality of the nanochains 2 are disposed. The metal 53 is a temperature measurement resistance element, for which a property that metal resistance value is dependent on the temperature is used. Here, the metal thin films for the electrodes 52A and 52B and the metal 53, or the like are formed with vapor deposition or sputtering. Platinum (Pt), copper (Cu), Ni (nickel), etc. are used for the metal 53 acting as the temperature measurement resistance element. The substrate 51 is formed of a substrate with high versatility, for example, a Si substrate, a GaAs substrate, etc.

As shown in FIG. 10B, one or more nanochains 2 are disposed on the metal 53 appropriately. When each nanochain 2 receives light or an electromagnetic wave in an arrow direction of FIG. 10 (from above), the plasmon resonance absorption corresponding to the length X of the nanochain takes place in each nanochain 2, so that each nanochain 2 generates the heat. The heat generated in each nanochain 2 is conducted to the metal 53, so that the temperature of the metal 53 rises. When platinum (Pt) is used for the metal 53, the electric resistance of platinum increases in proportion to the temperature. Then, as shown in FIG. 10, in a case of using a constant voltage source, an increase in the resistance value of platinum reduces a current that flows between the electrodes 52A and 52B. Accordingly, change in the temperature is detected using this.

Additionally, a region in which the metal 53 is formed is on a heat insulator 54, not on the substrate 51. This is for conducting the heat generated due to the plasmon resonance absorption to the metal 53 without losing any heat, thus increasing detection sensitivity. The heat insulator 54 is formed of a resin insulating layer, for example, $SiO_2$ or the like.

Alternatively, all of the portions of the electrodes 52A and 52B may be formed of the same material as that of the metal 53. For example, when platinum is used for the metal 53, all of the electrodes 52A and 52B can be also formed of platinum. However, not only the temperature change due to the heat generated in the nanochain 2 but temperature change generated in a portion of the electrodes 52A and 52B are mixed in this case. Therefore, it is not preferable since an error may occur in the plasmon resonance detection.

When the detector with the configuration of FIG. 10 is compared with the detector for which the thermocouple of FIG. 9 is used, the detector with the configuration of FIG. 10 has higher sensitivity to temperature change. However, as compared with the thermocouple, the configuration of FIG. 10 has longer time to reach thermal equilibrium, and therefore, slower response. Then, it is thought that the detector with the configuration of FIG. 10 is not preferable for measurement of a surface or fine point.

Figure 11:
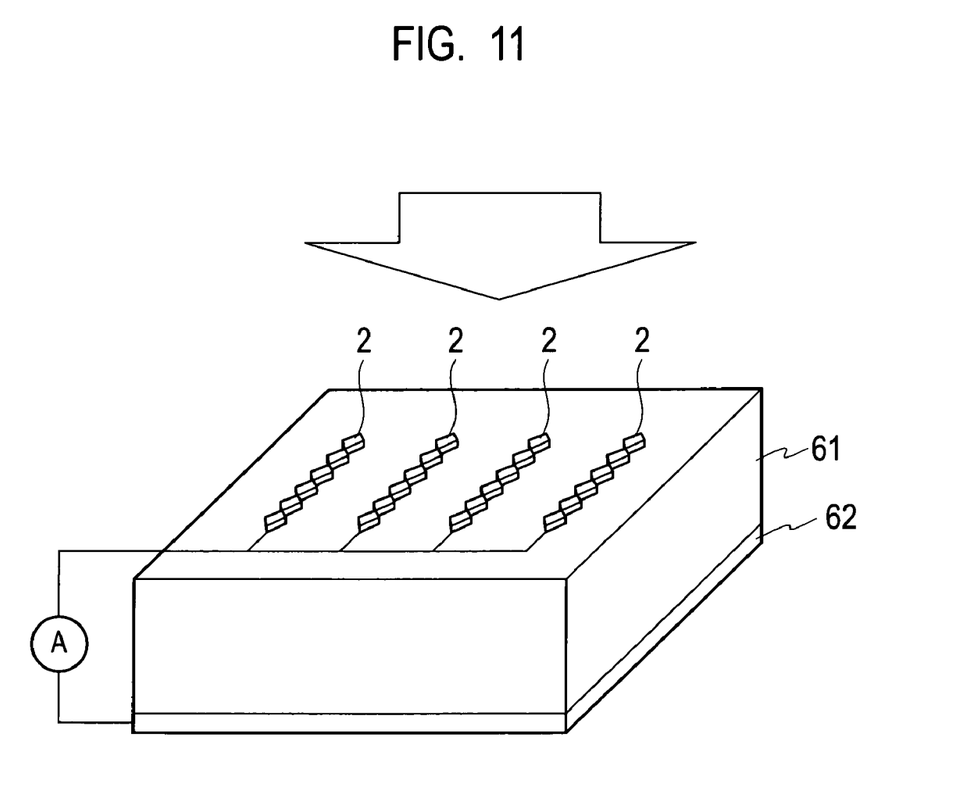
FIG. 11 is a perspective view showing an example of other structure of the plasmon resonance detector according to the present invention.

Next, FIG. 11 shows an example of a schematic configuration of the plasmon resonance detector for which a pyroelectric material is used as the temperature sensing element.

FIG. 11 shows an entire structure of the plasmon resonance detector. A pyroelectric material 61 is formed on an electrode 62. One or more nanochains 2 are formed on the pyroelectric material 61. Each nanochain 2 not only performs the plasmon resonance absorption, but also has a function as an electrode. The pyroelectric material 61 is formed of a material that causes pyroelectric effect. The pyroelectric effect refers to a phenomenon that a surface charge due to polarization varies in accordance with temperature change. A ferroelectric substance is certainly the pyroelectric material. As the pyroelectric material 61, for example, a film of PZT (lead zirconium titanate) that is a ferroelectric substance is produced, and the nanochain 2 is produced on the film. As other materials, LT (lithium tantalate) and LN (lithium niobate), which are semiconductor devices, PVDF (polyvinylidene fluoride), which is a ferroelectric resin, etc. can be used for the pyroelectric material 61.

Although the pyroelectric material 61 is always spontaneously polarized also at room temperature, polarization is not observed since ions are usually adsorbed on the surface. However, when the polarization changes as a result of changing the temperature, the amount of the surface charge also changes. Then, this changed amount can be detected as the voltage or current. Therefore, the temperature change can be obtained as the current or voltage according to the change in the amount of charge due to the polarization that is one of the electrical characteristics.

First, the pyroelectric material 61 is in a state of being spontaneously polarized at room temperature. Next, when each nanochain 2 receives light or an electromagnetic wave in an arrow direction of FIG. 11 (from above), the plasmon resonance absorption corresponding to the length X of the nanochain takes place in each nanochain 2, so that each nanochain 2 generates the heat. The heat generated in each nanochain 2 is conducted to the pyroelectric material 61, so that the temperature of the pyroelectric material 61 rises. An increase of the temperature changes the polarization state of the pyroelectric material 61. In accordance with change of the polarization state, for example, when the amount of charge reduces, the ions absorbed on the surface of the nanochain 2 are combined with ions on the side of the electrode 62. Thereby, a current occurs, and the current can be detected with an ammeter A. When the temperature returns to the original state, the polarization state also returns to the original state. Thus, since the amount of charge due to polarization also changes depending on an increase in the temperature, this change in the amount of charge is detected as a change in the current, etc.

As mentioned above, by using the thermocouple, the metal temperature measurement resistance element, the pyroelectric material, etc. for the temperature sensing element, and detecting change of the amount of charge due to the thermal electromotive force resistance, and polarization, etc. of electrical characteristics on the basis of changes in the temperature or the amount of heat generation, existence of the plasmon resonance and a magnitude of the plasmon resonance, as well as the resonance wavelength can be detected.

As for production of the nanochain 2, although the method of forming the nanochain on the sapphire substrate is specifically described in description of FIG. 8, the manufacturing process is simply summarized as follows. Preferably, the nanochain 2 is manufactured using a semiconductor fine processing technology. For example, a surface of a substrate or a base material is coated with a resist. A desired shape of a nano metal body is drawn on the resist with a beam of electrons. This drawing is developed, and the substrate is exposed in accordance with the shape of the nano metal body.

Subsequently, on the developed surface, sputtering of the metal is performed to form a metal film. An unnecessary metal film together with the resist is eliminated by liftoff, thereby to form the nanochain 2 where metal nanoparticles 2*a* are connected to one another.

Manufacturing of the nanochain can be performed in the similar manner to, for example, a production method of a metal structure described in Japanese Patent Application No. 2005-080579 or Japanese Patent Application No. 2005-258364.

What is claimed is:

1. A plasmon resonance detector comprising:
   a nanochain formed of a plurality of metal nanoparticles linked together at bottleneck regions and having plasmon resonance absorption; and
   a temperature sensing element on which the nanochain is disposed,
   wherein a temperature change caused by plasmon resonance absorption of the nanochain is detected from a change in an electrical characteristic of the temperature sensing element in accordance with the temperature change.

2. The plasmon resonance detector according to claim 1, wherein the temperature sensing element comprises a pyroelectric material and the electrical characteristic is an amount of charge due to polarization.

3. The plasmon resonance detector according to claim 1, wherein the temperature sensing element comprises a thermocouple and the electrical characteristic is thermal electromotive force.

4. The plasmon resonance detector according to claim 3, further comprising another nanochain, wherein the nanochain and the another nanochain are disposed so as to sandwich a temperature measuring junction of the thermocouple, and wherein one corner of one of the nanoparticles in each of the nanochain and the another nanochain faces toward the temperature measuring junction.

5. The plasmon resonance detector according to claim 1, wherein the temperature sensing element comprises a metal element, and the electrical characteristic is a resistance value.

6. The plasmon resonance detector according to any one of claim 3 to claim 5, wherein a region where the nanochain is disposed on the temperature sensing element is formed on a heat insulator.

7. The plasmon resonance detector according to claim 1, wherein the temperature sensing element comprises a semiconductor device, and the electrical characteristic is a resistance value.

8. The plasmon resonance detector according to claim 7, wherein the semiconductor device comprises a silicon film.

9. The plasmon resonance detector according to claim 8, wherein one corner of at least one of the metal nanoparticles that forms the nanochain is disposed on the silicon film.

10. The plasmon resonance detector according to claim 7, wherein the semiconductor device is a diode.

11. The plasmon resonance detector according to claim 10, wherein the nanochain is disposed around an electrode of the diode, and one corner of at least one of the metal nanoparticles that form the nanochain faces toward the electrode.

12. The plasmon resonance detector according to claim 11, wherein the electrode and the nanochain are disposed so as not to be in contact with each other.

13. A plasmon resonance detector comprising:
   a plurality of metal nanochains, each nanochain being shaped as a row of overlapping polygons; and
   a temperature sensing element on which the nanochains are disposed substantially parallel to one another and spaced apart from one another,
   wherein a temperature change caused by plasmon resonance absorption of the nanochains is detected from a change in an electrical characteristic of the temperature sensing element in accordance with the temperature change.

14. The plasmon resonance detector according to claim 13, wherein the temperature sensing element comprises a diode with an electrode having a heat conducting portion, wherein the nanochains are spaced apart from the heat conducting portion, and wherein each nanochain has an end with a corner portion that is pointed toward the heat conducting portion.

15. The plasmon resonance detector according to claim 13, wherein the temperature sensing element comprises a silicon film, and each nanochain has an end with a corner portion that is disposed on the silicon film.

16. The plasmon resonance detector according to claim 13, wherein the temperature sensing element comprises a thermocouple that includes two metal films that meet at junction, wherein the nanochains are first nanochains that are disposed on a first side of the junction, wherein the plasmon resonance detector further comprises a plurality of second metal nanochains that are disposed on a second side of the junction, and wherein each of the first and second nanochains has an end with a corner portion that is spaced apart from the junction and that faces the junction.

17. The plasmon resonance detector according to claim 13, wherein the temperature sensing element comprises a heat-insulating member and a metal film on the heat-insulating member, and wherein the nanochains are disposed on the metal film.

* * * * *